United States Patent [19]

Metcalfe et al.

[11] 3,851,138

[45] Nov. 26, 1974

[54] DIFFUSION BONDING OF BUTT JOINTS

[75] Inventors: Arthur G. Metcalfe, San Diego; Fred K. Rose, Chula Vista, both of Calif.

[73] Assignee: International Harvester Company, San Diego, Calif.

[22] Filed: Aug. 6, 1973

[21] Appl. No.: 385,721

Related U.S. Application Data

[60] Continuation-in-part of Ser. No. 226,570, Feb. 16, 1972, which is a division of Ser. No. 856,526, Sept. 8, 1969, Pat. No. 3,644,698.

[52] U.S. Cl. ........................ 219/83, 219/91, 219/117
[51] Int. Cl. ............................................ B23k 11/06
[58] Field of Search .......... 219/83, 84, 91, 117, 118

[56] References Cited

UNITED STATES PATENTS 2,892,921 6/1959 Mecklenborg .................... 219/83 X
3,095,500 6/1963 Jost .................................. 219/83 X
3,265,852 8/1966 Laws et al. .................. 219/117 R X

*Primary Examiner*—E. A. Goldberg
*Assistant Examiner*—N. D. Herkamp
*Attorney, Agent, or Firm*—Struch, Nolan, Neale, Nies & Kurz

[57] ABSTRACT

Methods of forming a diffusion bond between butted edges of metallic components. Pressure for forming the bond is developed by thermal expansion of the metal adjacent the joint with constraint on the top and bottom of the components in the bonding region. An elevated temperature is produced by passing an electric current through the components in the bonding region. The faying surfaces can be activated to increase the efficiency of the process as by passing hydrogen across them, for example.

13 Claims, 14 Drawing Figures

DIFFUSION BONDING OF BUTT JOINTS

This application is a continuation-in-part of Application No. 226,570 filed Feb. 16, 1972, which, in turn, is a division of Application No. 856,526 filed Sept. 8, 1969 (now U.S. Pat. No. 3,644,698).

The present invention relates to methods of forming a butt joint between two metallic sheets and, more particularly, to methods of forming a diffusion bond between such members.

Techniques for joining metallic members can be divided into several different categories.

One of these is fusion welding in which there is melting of the metal being joined in the welding zone. Arc- and torch-resistance and induction welders are exemplary of those of the fusion type.

Fusion welding is unsatisfactory in many circumstances because the high temperatures involved cause distortion and degrade or destroy the strength, ductility, and other metallurgical properties of the metals from which the members being joined are fabricated, especially if the metal is in a heat-treated condition. Further, in the fusion welding of oxidation sensitive metals, a protective atmosphere must be employed. This has obvious disadvantages.

Brazing and braze welding are broad terms describing another category of bonding processes which involve the melting of a filler metal disposed between two metallic components made of a different metal to join the components together. The filler has a melting point below that of the components being joined. Thus, distortion and degradation of metallurgical properties may be less serious than in the case of fusion welding. However, because of the dissimilar materials, brazed joints are inherently weaker than the joined components and are subject to galvanic corrosion, making these bonding techniques unsatisfactory in many circumstances.

Metallurgical or diffusion bonding identifies another broad category of bonding techniques which has on occasion been employed because of the disadvantages of fusion welding and brazing. In metallurgical bonding, pressure is applied to the members being joined at a temperature below the melting point; and the atoms of the materials from which the members are fabricated diffuse across the faying surface or interface therebetween. Versions of metallurgical bonding heretofore employed include pressure bonding, gas pressure bonding, and roll or deformation bonding.

In pressure bonding the members to be joined are typically assembled in a thin-walled retort to provide a protective atmosphere. The retort is then heated by platens, and pressure is applied by a platen press. The pressure is maintained until the bond is formed.

Problems encountered in pressure bonding include contamination of faying surfaces and gas entrapment between faying surfaces unless expensive vacuum bags are used. Even then, the contamination problem is not always satisfactorily solved because of the gaseous contaminants liberated in the long heating cycle which is required.

Also, major surface depressions are not subjected to pressure, and this leads to bond line voids in the final product. Further, this technique has a limited scale-up potential because the cost of the equipment increases rapidly with size.

We have now invented a novel technique for forming butt joints which does not have the disadvantages of heretofore available fabrication processes and has a number of advantages they do not possess. Our novel, improved methods and equipment allow metallic parts to be butt joined by diffusion bonding in only a few seconds in air or with simple protection from the atmosphere. Also, our invention provides an increased capability for joining diverse parts of varying sections, significantly reduces process times, and eliminates the need for a vacuum or inert gas environment in many instances. Moreover, our invention limits heating of the parts to a small area being bonded, minimizing or eliminating metallurgical damage. It also permits precise control of pressure and temperature, which provides improved, reproducible results.

In the making of butt joints by diffusion bonding in accord with the present invention, the parts are assembled with their edge surfaces in butting relationship. Localized pressure is exerted on the parts to be joined, and localized heating of the parts in the bonding area is produced. The temperature and pressure are maintained low enough that no melting occurs, but high enough for the parts to become sufficiently plastic to eliminate porosity and to shear surface contaminants in the bonding area. Local plastic flow begins at a few asperities and gradually spreads as the pressure on the parts increases until full contact between the parts is reached.

The areas over which the metals come into contact are brought by electrical resistance heating to the temperature at which metallurgical bonding occurs within a few seconds. Therefore, the bulk of the metal in the parts being joined remains in a relatively cold state, even though the metal contiguous to the line of contact is heated to the point that it attains the necessary degree of plasticity. This permits parts to be joined with only minimal, if any, degradation of their metallurgical properties.

The requisite pressure is created by disposing the members on a suitable support and biasing a rotatable electrode or wheel of heat-resistant, conductive material against the members at right angles to the faying surface by, for example, a fluid-activated motor to constrain the components being joined and thereby keep them from expanding outwardly in the joint area. Programmed electrical current is passed through the electrode, workpiece, and support (which may be a second rotatable electrode) to produce localized heat in the bonding area; i.e., those areas of the parts contiguous to the line of contact between the electrodes.

The thermal expansion of the components being joined under the constraint afforded by the electrode and support causes the members to expand toward each other along the faying surface therebetween to produce the requisite bonding force, the lateral pressure between the abutting or faying surfaces building up as the components are heated because of increasing thermal expansion.

To further improve the diffusion bond, a foil strip with uniform width may be placed on each side of the workpiece over the joint. These strips keep the workpiece components from separating at the faying surface. Also, because the strips are uniform in width, the contact area for the electrode is uniform as is the current density and temperature distribution, the highest temperature being at the centerline of the strips and, consequently, at the joint if the strips are symmetrically positioned relative to it. The current passing through the electrode, workpiece, and support heats them concurrently so that the parts being joined approach an isothermal condition. That is, the surface temperatures of the workpiece components do not vary greatly from the temperature at the center of the abutting surfaces. This results in the formation in the joint of a microstructure which is uniform and like that of the material in the parts being joined. This is important in that the joint is, as a consequence, as strong as the components being joined.

Furthermore, the localized deformation of the parts along the bond line prior to significant heating brings the parts together and excludes contaminating gases from the bonding area before such heating occurs. As a consequence, titanium and other reactive metals and alloys can be joined in air; i.e., without the heretofore necessary protective atmosphere or vacuum.

Another advantage of the present invention is that bonds may be formed much more rapidly (in one to a few seconds) than by the heretofore employed metallurgical bonding techniques. These process cycle times are measured in terms of hours, not seconds.

Yet another advantage of our process is that the length of the joint is not limited as it is in pressure bonding, for example.

A further advantage of our process is that surface preparation is not critical as long as the parts being joined are clean. This is important as it significantly reduces the cost of preparing the parts for bonding.

Still another advantage of the invention is that metals and their alloys can be bonded without damage at higher temperatures than by other processes. For example, titanium may be satisfactorily joined at temperatures up to 400°F above the beta transus. This is surprising as it has heretofore been thought that titanium must be joined at temperatures below the beta transus to prevent unacceptable degradation of mechanical properties in the joint area. This attribute of the present invention is important because solution or spheroidization of surface oxides occurs more rapidly as the temperature is raised with a corresponding reduction in time required to produce a sound joint.

Still another important advantage of our invention is that repairs to bonds can be made, and parts can be added and changed without putting the entire structure through a second bonding cycle. This provides a decided advantage over heretofore available metallurgical bonding techniques from an economic point-of-view.

In addition, in the novel techniques described herein, the tooling employed to maintain the parts being joined in the proper relationship is heated to only relatively low temperatures. Accordingly, the tooling has a long service life, even if made from inexpensive materials such as mild steel.

From the foregoing it will be apparent that the primary object of the present invention resides in the provision of novel, improved methods for producing butt joints between metallic members.

Other related and also important but more specific objects of this invention reside in the provision of novel, improved metallurgical bonding techniques:

1. capable of producing butt bonds in times much shorter than those required in other techniques of making solid state metallurgical bonds.

2. by which butt joints between oxidation sensitive materials can be produced in air and which, accordingly, do not require a vacuum or protective gas environment.

3. capable of minimizing metallurgical damage to the parts being joined, even when they are composed of metals in a heat-treated condition.

4. in which there is minimal deformation of the parts being joined so that smooth surfaces result on the joined part.

5. which require a minimum of surface preparation.

6. in which there is not the limitation on the length of the parts being joined appurtenant to heretofore employed metallurgical bonding techniques.

Other important objects and features and further advantages of the present invention will become apparent from the appended claims and from the ensuing detailed description of certain preferred embodiments of the invention taken in conjunction with the accompanying drawings, in which:

Figure 1:
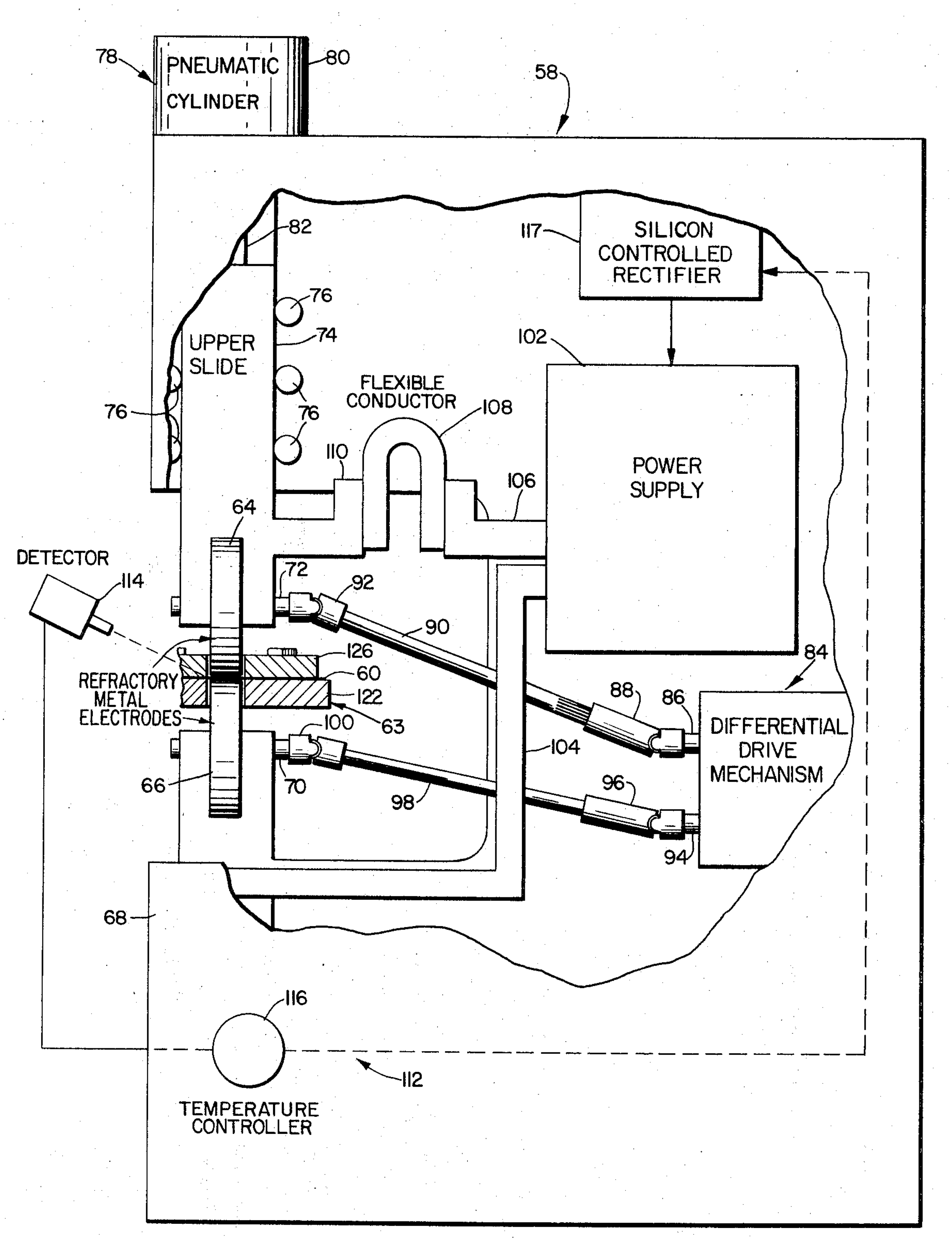
FIG. 1 is a fragmentary view of apparatus for forming butt joints in accord with the principles of our invention, the apparatus including a jig for holding the parts to be joined in butting relationship and rotatable pressure applying electrodes between which the parts are passed to form a joint therebetween.

The novel process for producing butt joints described briefly above involves the application of localized heat and pressure to butted parts by a rotatable electrode fabricated of a heat resistant conductive material to join the parts into a unitary structure by forming a continuous bond between them as they are moved relative to the electrode. The parts are confined against separation in an appropriate jig and are supported either on a stationary structure or by a second electrode of the character just described. The pressure applying electrode and the support keep the parts from expanding outwardly in the joint area as the temperature increases. Consequently, the parts expand toward each other in the bonding area with the formation of a bond therebetween.

The electrode pressure is exerted in a direction parallel to the interface or faying surface between the parts being joined and is produced by biasing the rotatable electrode against the parts with a force of predetermined magnitude. This localizes the pressure to an area generally commensurate in width with the electrode and extending longitudinally in the direction of movement for a short distance from the line of contact between the rotatable electrode and the member against which it is biased; i.e., from the nip of the electrode. This incremental application of bonding pressure is an important attribute of the invention as the pressure can be applied more uniformly than in heretofore available metallurgical bonding processes.

The heat is generated by completing a circuit from the pressure applying electrode through the parts being joined to the support. High temperatures are thereby confined to a localized area generally nearly equal in width to the electrode and extending generally from the line of contact between the electrode and the member against which it is biased in the direction of movement of the parts being joined.

These parts are not heated to more than an insignificant extent before they are contacted by the electrode because there is no current path across the parts until the members are brought into firm contact. This minimizes the formation of surface oxides.

As a result, the bonding cycle can be carried out in air even though the parts are fabricated of titanium or other reactive metals. This provides a considerable economic advantage over previously employed diffusion bonding processes. In these methods the parts being joined must be disposed in an evacuated or inert gas filled environment if they are made of reactive metals. And even this precaution sometimes produces only minimally satisfactory results.

The pressures and temperatures employed in the present invention will vary depending upon the composition of the parts being joined, their thickness, the bonding speed and similar considerations. It is essential, however, that the temperature be maintained low enough to keep the parts in the solid state throughout the cycle (i.e., to prevent melting in the bonding area).

On the other hand, the temperature and pressure must be high enough to bring the surfaces being joined into complete contact and allow a diffusion of atoms across the faying surface to form the bond. This in turn requires that the pressure be sufficiently high to cause localized deformation of the parts along the surfaces at which they are to be joined by causing plastic flow in order to shear oxides from these bonding surfaces.

Also, the temperature to which the parts are heated in the bonding area must be high enough to permit the required diffusion of atoms across the faying surface to be completed in not more than a few seconds.

Titanium alloys such as Ti-6Al-4V represent one class of materials which the novel technique described herein can be used to particular advantage to join. For such materials, typical bonding pressures are in the range of 600 to 10,000 p.s.i. (for a typical 8 inch diameter rotatable electrode, these pressures can be realized by using electrode-exerted forces of 100 to 2,000 pounds per inch of wheel width), and peak temperatures are maintained in the range of 1,750°F–2,300°F. by employing currents in the 2,000 to 20,000 ampere range.

In a typical manufacturing operation involving parts fabricated from alloys of the type in question, bonding speeds of 5 to 10 inches per minute can be readily attained. This represents a considerable advantage over the heretofore employed metallurgical bonding techniques in which the cycle time required to produce a bond is typically an hour or more.

In conjunction with the foregoing it was pointed out above that the capability of the present invention for joining titanium and its alloys at temperatures even as high as 2,300°F. without degradation of the material in the joint area is completely unique. Titanium alloys heated to temperatures above the beta transus by heretofore known techniques show a sharp decrease in ductility, and processing at high temperatures has accordingly heretofore been avoided. Surprisingly, it has been discovered that temperatures above the beta transus for only a few seconds as in the present invention do not produce a significant decrease in ductility.

This is important in that the ability to use higher temperatures results in decreased process time because of the more rapid solution or spheriodization of the surface oxides on the surface of the parts being joined. Also, advantage can be taken of the desirable attributes of beta treatment including increased notch strength, improved resistance to stress corrosion cracking, and increased fracture toughness.

Referring now to the drawing, FIG. 1 depicts diagrammatically one form of metallurgical bonding apparatus 58 which may be employed to form a butt joint between members 60 and 62 in accord with the principles of the present invention. In apparatus 58 bonding is accomplished by confining parts 60 and 62 in a jig and then effecting movement of the parts between rotatable upper and lower, pressure applying and support electrodes 64 and 66. The electrodes are fabricated from a conductive, heat resistant, high strength, metallic material such as molybdenum.

Lower electrode 66 is rotatably supported from the frame 68 of machine 58 by a shaft 70 journalled in suitable bearings (not shown). The upper electrode is rotatably supported by a similar shaft 72 from a slide 74. Slide 74 is mounted for vertical rectilinear movement toward and away from lower electrode 66 in guides 76.

In the processing cycle, a force of predetermined magnitude is exerted on the parts 60 and 62 being joined by biasing slide 74 and upper electrode 64 toward lower electrode 66. The bias is exerted by a pneumatic cylinder 78 which includes a barrel 80 fixed to the frame 68 of the apparatus and a connecting rod 82 extending from the barrel and fixed to the upper end of slide 74.

The relative movement of parts 60 and 62 referred to above is accomplished in apparatus 58 by a conventional differential drive 84 having one output shaft 86 connected to the shaft 72 supporting upper electrode 64 by universal joint 88, shaft 90, and universal joint 92. A second output shaft 94 from drive mechanism 84 is connected to the shaft 70 supporting lower electrode 66 by universal joint 96, shaft 98, and universal joint 100.

Heat is applied to the components being joined by connecting one side of the output from a conventional AC or DC power supply 102 through conductor 104 to lower support electrode 66. The other side of the power supply is connected through rigid conductor 106, flexible conductor 108, and rigid conductor 110 to upper, pressure applying electrode 64.

The final major component of bonding apparatus 58 is a control system identified generally by reference character 112. The primary function of the control system is to so regulate the current flowing through the parts being joined and the unitary structure into which they are formed as to maintain the bonding temperature substantially constant or to vary it in a predetermined pattern. This system typically includes a detector or sensor 114 for detecting conditions at the bond line and feeding back a signal to a temperature or process controller 116 for comparison with a set point reading to determine deviations from desired value. The process controller translates any deviations from the predetermined conditions into a corrective signal. This signal is fed to a power controller 117 by which the flow of current to and voltage across power supply 102 is regulated.

Diffusion bonder 58 is described in more detail in the above-mentioned U.S. Pat. No. 3,644,698 to which the reader may refer, if desired.

Figure 2:
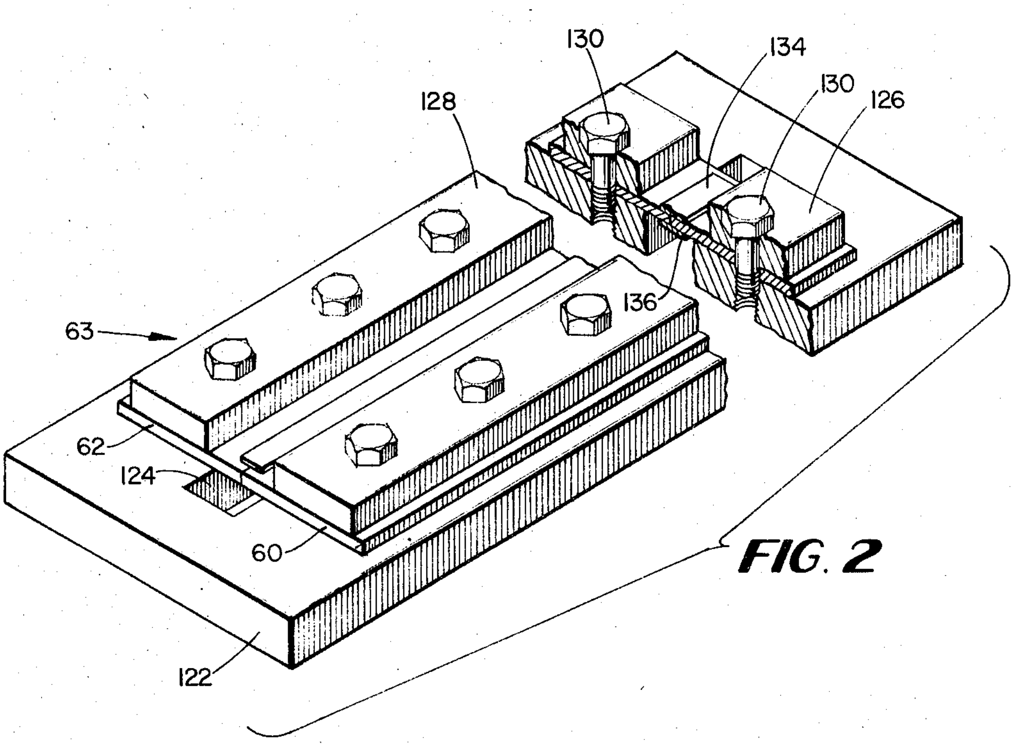
FIG. 2 is a pictorial representation of a jig.
Figure 3:
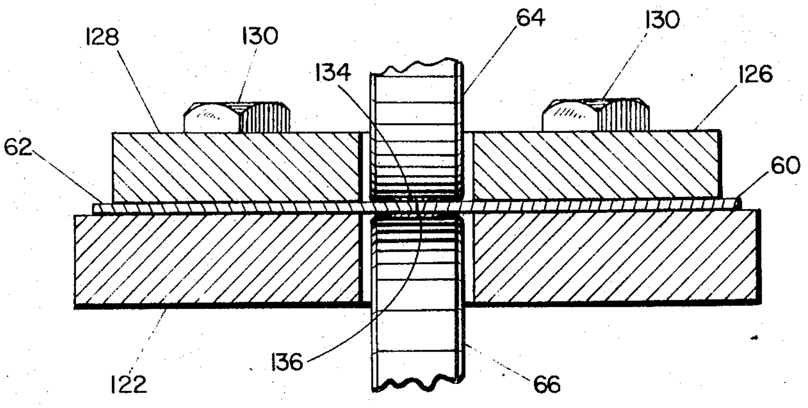
FIG. 3 is a section through the jig shown in FIG. 2 and two members being joined in apparatus as shown in FIG. 1.

Referring again to the drawing, FIGS. 2 and 3 depict in more detail the jig 63 used in conjunction with bonding apparatus 58 to form butt joints in accord with the principles of the present invention. Jig 63 includes an elongated base 122 in which a longitudinally extending slot 124 is formed and blocks 126 and 128 which can be clamped against the base by bolts 130 or other clamping devices of appropriate character.

The components to be joined, in this case sheets 60 and 62, may be machined so that the edges along which the members are to be joined will be straight and square and thereby make as close a fit at the faying surface as possible although this step is in many cases not necessary. Members 60 and 62 are assembled on base 122 in butting relationship. Blocks 126 and 128 are then placed over the members and bolts 130 tightened to clamp the members against base 122.

In operation, the assembly consisting of the jig and the parts to be joined are passed between the electrodes 64 and 66 of the bonding apparatus to form a bond between the parts.

The following examples depict in more detail the formation of butt joints in accord with the principles of the present invention.

EXAMPLE I

Bonding apparatus and a jig as identified by reference characters 58 and 63 were employed to form a butt joint between two 0.080 inch thick sheets of Ti-6Al-4V alloy. Titanium alloy foil strips 134 and 136, 0.002 inch thick and 0.5 inch wide, were centered on the joint between the parts before the bond was formed, one on each side of the workpiece as suggested in FIG. 2.

The electrodes were 10 inches in diameter and 0.75 inch wide and were made of molybdenum. The rate of movement of the parts being joined relative to the electrodes was 6 inches per minute.

Figure 4:
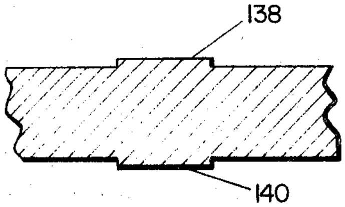
FIG. 4 is a section through two members joined by a butt joint formed in accord with the principles of the invention.

The structure in the joint between parts 60 and 62 was substantially uniform and identical to that elsewhere in the parts. Slight protuberances 138 and 140 were produced in the region of the joint, as suggested by FIG. 4. These were readily removed by grinding.

Tensile test specimens were machined from the bonded component in a direction normal to the joint therebetween. The ultimate strength of these specimens ranged from 144,000 to 146,000 pounds per square inch. Failure occurred outside of the butt joint.

EXAMPLE II

The procedure just described also was used to butt join two 0.5 inch thick titanium alloy plates. Titanium strips were again used on both sides of the workpiece. These had a thickness of 0.16 inch and were 0.5 inch wide.

The end product had good mechanical qualities. In bend tests fracture developed in the parent material at the transition points coincident with the edges of the overlying strips rather than in the butt joint. This could have been prevented by grinding down the strips after the bonding operation.

EXAMPLE III

In another test, butt joints were formed in 0.125 inch thick Ti-6Al-4V. The edges of the sheets to be joined were machined square, and the sheets were then clamped together. Steel strips ⅛ inch thick by one inch wide were laid across the joint, one on each side of the assemblage of sheets.

The bonding parameters were as follows:

Electrode: 10 inch diameter and 0.8 inch wide, fabricated of TZM alloy

Force exerted on sheets parallel to the butted edges: 2,540 pounds

Bonding Speed: 4 inches per minute

Current: 10,400 amps

Figure 7:
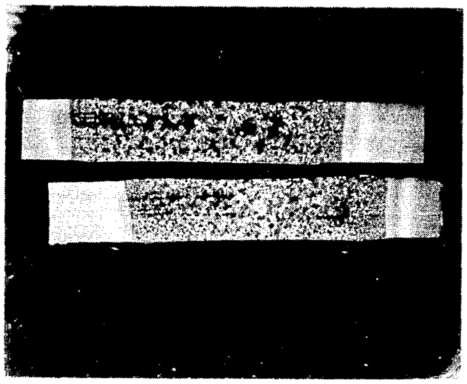
FIGS. 7–13 are photomicrographs of joints formed in accord with the principles of the present invention.
Figure 8:
Figure 9:

The steel was etched away with nitric acid after bonding was completed, and photomicrographs of the joint were made (FIGS. 7 (3.5X), and 8 and 9 (125X)). These show that a butt joint of high quality was formed.

The titanium and steel strips employed in forming the butt joints described in the preceding examples perform several important functions.

The first is to provide members which will become plastic during the bonding process. In doing so, they insure that bonding will occur between the members being joined to the extreme surfaces of the members.

A second function of the strips is to eliminate direct contact between the hot electrode(s) and the members being joined. This assists in keeping the temperature of these members uniform throughout their thickness, even if the surface of the electrode is not at exactly the same temperature as the members being joined. This maintenance of a uniform temperature across the members is essential to the production of a joint having the same microstructure as the members being joined.

Strips as described above may also be utilized to reinforce the bond. In this case strips of the same material as the members being joined are employed.

A fourth function of the strips is to exclude air from the bonding area. This contributes to the production of a superior bond when materials such as titanium are being joined.

Yet another function of the strips is to slow the cooling of the members being joined; i.e., to increase the thermal lag. This is important for the reasons discussed in detail in U.S. Pat. No. 3,644,698.

EXAMPLE IV

Butt joints were made in 0.060 inch thick Hastelloy X alloy (Ni, 22; Cr, 9; Mo, 1.5; Co, 18.5; Fe) by the procedure just described. In this test sheets which had been sheared but not machined or otherwise processed to produce square or straight edges were employed.

Foil strips of Hastelloy X 0.002 inch thick were held in place on each side of the butted Hastelloy X members by spot-tack welding, and the assembly was covered with mild steel foil. Hydrogen was passed through the mild steel cover during the bonding process.

The major bonding parameters were:

Electrode: 10 inch diameter by 0.8 inch width, fabricated of TZM

Bonding speed: 3.5 inches per minute

Force exerted by electrode in a direction parallel to the butted edges: 3,450 pounds Current: 8,400 amps Estimated bonding temperature: 2,150°F.

Tensile test specimens failed at forces of 101–113 ksi. This showed that the strength in the joints was equal to that of the parent Hastelloy X alloy.

Figure 10:
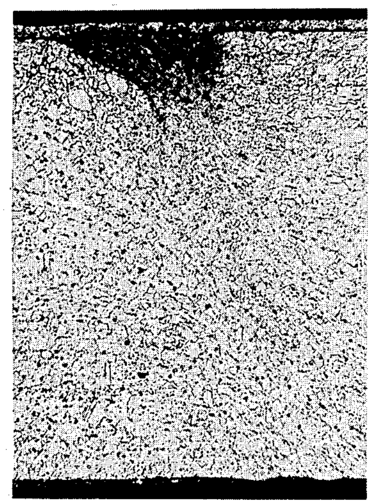
Figure 11:
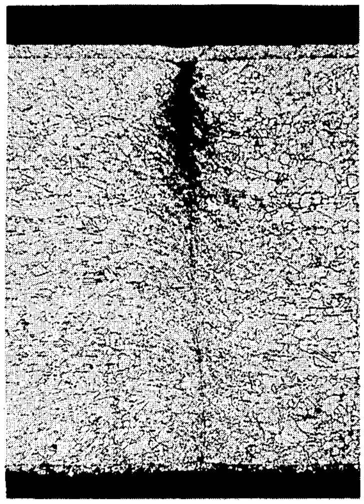
Figure 12:
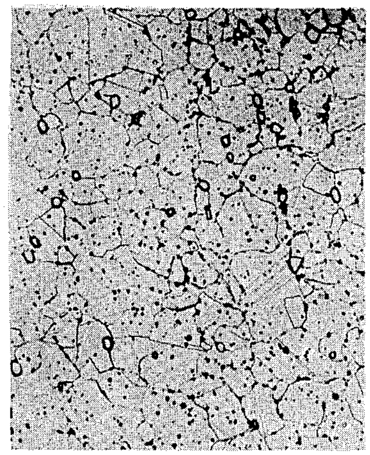
Figure 13:

FIGS. 10–13 are photomicrographs of four joints made in this test and show the high quality results which our process is capable of producing. FIGS. 10 and 11 are 50X magnifications, and FIGS. 12 and 13 are 500X.

EXAMPLE V

Figure 5:
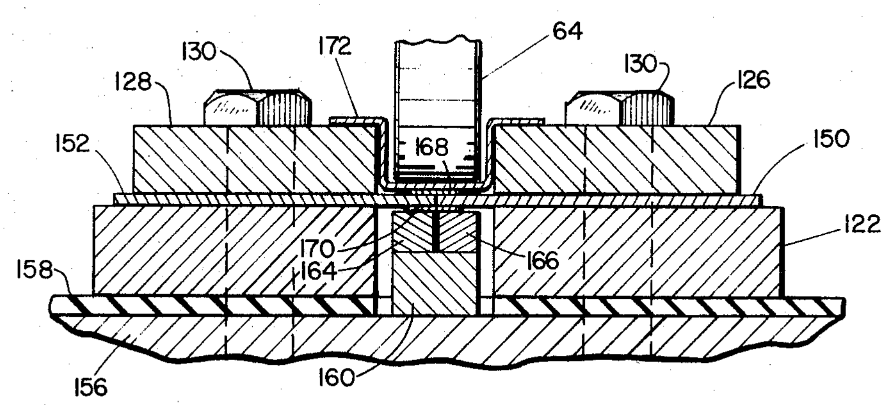
FIG. 5 is a view similar to FIG. 3 of a second form of apparatus in accord with the principles of the invention.

Referring now to FIG. 5, substantially the same process as described above was used to butt join 0.062 inch thick sheets 150 and 152 of Hastelloy X.

The jig and Hastelloy X strips were supported from a copper table 156 and insulated therefrom by insulator 158. A mild steel support 160 and molybdenum bars 164 and 166 on table 156 replaced the lower electrode (single electrode apparatus which can be employed for the purposes of the present invention is also disclosed in U.S. Pat. No. 3,644,698).

Hastelloy X strips 168 and 170, 0.002 inch thick and 0.25 inch wide, were centered on the joint between sheets 150 and 152 on both sides of the sheets. A stainless steel foil 172, 0.001 inch thick, was placed between upper Hastelloy foil 168 and electrode 64 to exclude air from the bonding region. Hydrogen was introduced beneath the stainless steel foil and removed from the top thereof through an opening (not shown) in the foil. The hydrogen gas reduced the oxide films on the sheets being joined, insuring a better bond.

The electrode was 8 inches in diameter and 0.75 inch thick. A force of 3,500 pounds was applied to the electrode, and the bond was formed at the rate of 3.5 inches per minute at a temperature in the range of 2,175°–2,225°F. Test sections made from the butt-joined members had a tensile strength of 102,000 to 110,000 pounds per square inch. This is approximately the tensile strength of the parent Hastelloy X material.

The principles of the present invention can be adapted to the repair of imperfections in various components in addition to being employed as described above.

Figure 6:
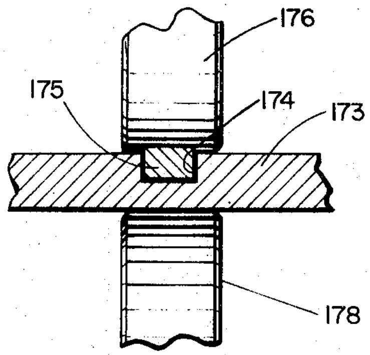
FIG. 6 is a view similar to FIG. 5 showing how apparatus of the type illustrated in that figure can be employed to fill voids in metallic components.

A typical application of this character is the repair of cracks in gas turbine fan blades. The manner in which this is accomplished can best be understood by reference to FIG. 6 in which the blade being repaired is identified by reference character 173.

The material surrounding the crack is milled away or otherwise removed to form a slot 174 in which a filler bar 175 made from the same material as the the component being repaired is placed. The filler bar will typically be dimensioned to protrude a few thousandths of an inch from the slot.

The component and filler strip are then passed between electrodes 176 and 178 which may be of the character described above and incorporated in bonding apparatus such as that illustrated in FIG. 1. The pressure exerted and constraint produced by the electrodes and the heat generated by the current flowing between the electrodes through the filler and fan blade causes the filler metal to expand toward the sides of the slot, forming a diffusion bond between the filler bar and the component being repaired.

Figure 6A:
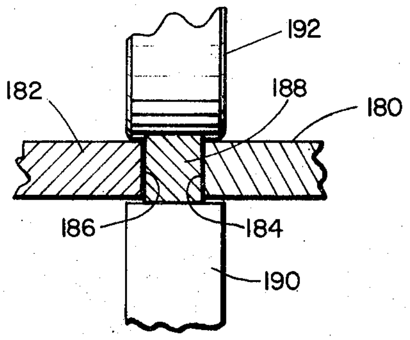
FIG. 6A is a view similar to FIGS. 5 and 6, but showing the use of the apparatus illustrated in fragmentary form in those figures to join two members by an insert disposed in the gap therebetween.

The technique just described can be extended to the repair of a component which has broken into two fragments as those identified by reference characters 180 and 182 in FIG. 6A.

The edges along which the fragments 180 and 182 are to be joined are first preferably machined, if necessary, to provide flat surfaces 184 and 186.

A filler bar 188 is then inserted between fragments 180 and 182 and the latter butted against the filler as by using a jig such as that identified by reference character 122.

In the illustrated example the assemblage is mounted on a support 190 and relative movement between the support and electrode 192 effected to form diffusion bonded butt joints between the filler strip 188 and each of the two fragments 180 and 182.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A dynamic diffusion bonding method of butt joining two metallic members into a unitary structure by forming a continuous bond therebetween, comprising the steps of:

a. maintaining the two members to be joined in side-by-side relationship between a support means and a rotatable electrode with the joint between said members extending from said support means toward said electrode;

b. exerting a localized pressure on successive increments of said members in the region of the joint therebetween by biasing said electrode against both of said members and toward the support means and concomitantly effecting relative movement between said members and said electrode;

c. simultaneously with the exertion of said localized pressure, locally heating only the portions of the members on which the pressure is exerted in the regions of the members adjacent the joint therebetween, said heating being accomplished by passing an electrical current from said electrode through the members being butt joined to the supporting means; and d. so regulating the current density through the members being joined as to maintain the maximum temperature of each of said members below the melting point of the material of which said member is composed and thereby prevent melting of the members but high enough to exceed the yield stress of the material from which each said member is fabricated in a region contiguous to the joint therebetween and produce sufficient expansion of the members toward each other and sufficient localized plastic flow of each of the members being joined to insure essentially complete metal-to-metal contact between said members over the area of said joint to permit a diffusion of atoms of the materials of which said members are composed across said joint which will produce a continuous bond between said members.

2. The method of claim 1, together with the step of interposing a metallic strip which is independent of the members being joined between the rotatable electrode and the members being joined, said strip being placed over the joint between said members.

3. The method of claim 2, together with the step of interposing a second metallic strip between the members being joined and the supporting means, said second strip also being independent of the members being joined and being placed over the joint between said members.

4. The method of claim 2, wherein said strip is of the same material as the members being joined.

5. The method of claim 2, together with the step of removing said strip after the members are joined.

6. The method of claim 1, together with the step of maintaining a reducing atmosphere in the region in which bonding takes place while said bond is being formed, said reducing atmosphere being maintained by disposing a shield adjacent the members being joined and effecting a flow of a reducing gas between said members and said shield.

7. A dynamic diffusion bonding method of joining two metallic members into a unitary structure by forming a continuous bond therebetween, comprising the steps of:

a. disposing one of said members in a recess in the other of the members;
b. disposing said members between a support means and a rotatable electrode;
c. exerting a localized pressure on successive increments of said members by biasing said electrode against both of said members and toward the support means and concomitantly effecting relative movement between said members and said electrode;
d. simultaneously with the exertion of said localized pressure, locally heating the portions of the members on which the pressure is exerted by passing an electrical current from said electrode through the members being joined to the supporting means; and
e. so regulating the current density through the members being joined as to maintain the maximum temperature of each of said members below the melting point of the material of which said member is composed and thereby prevent melting of the members but high enough to exceed the yield stress of the material from which each said member is fabricated to thereby produce sufficient expansion of the members toward each other and sufficient localized plastic flow of each of the members to insure essentially complete metal-to-metal contact between said members to thereby permit a diffusion of atoms of the materials of which said members are composed which will produce a continuous bond between said members.

8. A dynamic diffusion bonding method of joining two metallic members into a unitary structure by forming a continuous bond therebetween, comprising the steps of:

a. disposing a filler member between the two members to be joined;
b. maintaining the two members to be joined and the filler member in side-by-side relationship between a support means and a rotatable electrode with the joints between said first-mentioned members and the filler member extending from said support means toward said electrode;
c. exerting a localized pressure on successive increments of said members in the region of the joints there-between by biasing said electrode against said members and toward the support means and concomitantly effecting relative movement between said members and said electrode;
d. simultaneously with the exertion of said localized pressure, locally heating the portions of the members on which the pressure is exerted in the regions of the members adjacent the joints therebetween by passing an electrical current from said electrode through the members to the supporting means; and
e. so regulating the current density through the members as to maintain the maximum temperature of each of said members below the melting point of the material of which said member is composed and thereby prevent melting of the members but high enough to exceed the yield stress of the material from which each said member is fabricated in regions contiguous to the joints therebetween to thereby produce sufficient expansion of the members toward each other and sufficient localized plastic flow of the members to insure essentially complete metal-to-metal contact between said members over the areas of said joints to permit a diffusion of atoms of the materials of which said members are composed across said joints which will produce continuous bonds between each of the members being joined and the filler member.

9. A dynamic diffusion bonding method of butt joining two metallic members into a unitary structure by forming a continuous bond therebetween, comprising the steps of:

a. disposing the two members to be joined in butting relationship between a support means and an electrode with the butting surfaces of said members extending from said support means toward said electrode;
b. exerting a localized pressure on said members in the region of the joint therebetween by biasing said electrode against both of said members and toward the support means;
c. simultaneously with the exertion of said localized pressure, locally heating the portions of the members on which the pressure is exerted in the regions of the members adjacent the joint therebetween by passing an electrical current from said electrode through the members being butt joined to the supporting means; and
d. so regulating the current density through the members being joined as to maintain the maximum temperature of each of said members below the melting point of the material of which said members is composed and thereby prevent melting of the members but high enough to exceed the yield stress of the material from which each said member is fabricated in a region contiguous to the joint therebetween and produce an expansion of the members toward each other and localized plastic flow of each of said members to an extent such that there will be essentially complete metal-to-metal contact between said members over the area of said joint to permit a diffusion of atoms of the materials of which said members are composed across said joint to produce a continuous bond between said members.

10. A diffusion bonding method of butt joining two metallic members into a unitary structure by forming a continuous bond therebetween, comprising the steps of:

a. disposing the two members to be joined in butting relationship between a support means and an electrode with the butting surfaces of said members extending from said support means toward said electrode;

b. locally heating the portions of the member on which the pressure is exerted in the regions of the members adjacent the joint therebetween by passing an electrical current from said electrode through the members being butt joined to the supporting means;

c. so regulating the current density through the members being joined so as to maintain the maximum temperature of each of said members below the melting point of the material of which said member is composed and thereby prevent melting of the members; and d. simultaneously with the heating of the members being joined, exerting on said members in the region of the joint therebetween by biasing said electrode against both of said members and toward the support means a localized pressure of sufficient magnitude to, at the temperature to which the members being joined are heated, cause the metal from which the members being joined are formed to become plastic and to, in co-operation with the lower temperature portions of said members, constrain such metal against flow in directions other than toward the joint between the members, thereby producing an expansion of the plastic metal toward the joint which will result in essentially complete metal-to-metal contact between said members over the area of said joint and permit a diffusion of atoms of the materials of which said members are composed across said joint to produce a continuous bond between said members.

11. The method of claim 10, together with the step of mechanically restraining the members being joined against separation during the formation of the bond therebetween.

12. The method of claim 11, wherein the members being joined are restrained against separation by confining them in an appropriate jig.

13. The method of claim 10, together with the step of promoting the quality of the bond between the members being joined by, prior to the heating and application of pressure to the workpiece, centering over the joint therebetween and between said members and the electrode or the workpiece support or both, a thin metallic strip which will become plastic at said temperature and pressure.

* * * * *